US012480334B2

(12) United States Patent
Navratil et al.

(10) Patent No.: US 12,480,334 B2
(45) Date of Patent: Nov. 25, 2025

(54) FLAT KEY FOR A LOCKING CYLINDER

(71) Applicant: DORMAKABA AUSTRIA GMBH, Herzogenburg (AU)

(72) Inventors: Heinz Navratil, Herzogenburg (AU); Markus Kornhofer, Herzogenburg (AU)

(73) Assignee: DORMAKABA AUSTRIA GMBH, Herzogenburg (AT)

( * ) Notice: Subject to any disclaimer, the term of this patent is extended or adjusted under 35 U.S.C. 154(b) by 0 days.

(21) Appl. No.: 18/708,120

(22) PCT Filed: Nov. 11, 2022

(86) PCT No.: PCT/EP2022/081619

§ 371 (c)(1),
(2) Date: May 7, 2024

(87) PCT Pub. No.: WO2023/084022

PCT Pub. Date: May 19, 2023

(65) Prior Publication Data

US 2025/0012112 A1 Jan. 9, 2025

(30) Foreign Application Priority Data

Nov. 15, 2021 (AU) ................................ 50232/2021

(51) Int. Cl.
*E05B 19/00* (2006.01)
*E05B 27/00* (2006.01)

(52) U.S. Cl.
CPC ...... *E05B 19/0041* (2013.01); *E05B 19/0029* (2013.01); *E05B 19/0058* (2013.01); *E05B 27/0042* (2013.01)

(58) Field of Classification Search
CPC ............. E05B 19/0017; E05B 19/0023; E05B 19/0029; E05B 19/0041; E05B 19/0052;
(Continued)

(56) References Cited

U.S. PATENT DOCUMENTS 4,683,740 A * 8/1987 Errani ..................... E05B 27/00 70/420
D368,845 S * 4/1996 Widen ........................... D8/347
(Continued)

FOREIGN PATENT DOCUMENTS

DE 102005036113 A1 3/2006
EP 2700775 A2 * 2/2014 ......... E05B 19/0041
(Continued)

OTHER PUBLICATIONS

International Search Report for Application No. PCT/EP2022/081619, dated Feb. 3, 2023, 3 pages.
(Continued)

*Primary Examiner* — Christopher J Boswell
(74) *Attorney, Agent, or Firm* — CANTOR COLBURN LLP

(57) ABSTRACT

A flat key for a locking cylinder has substantially flat and approximately parallel flat key sides, a key rear section, and a key front section opposite thereto. The key front section has a toothing for positioning tumbler pins divided into core pins and housing pins and which are spring-loaded against the key front section in the direction of the key rear section and into corresponding bores. Grooves in the form of profiled variation elements and profiled guiding elements are provided in the flat sides of the flat key, wherein at least two grooves of one flat side of the flat key, which are preferably part of the profiled guide, overlap and are undercut in opposite directions. A depression is provided in the outer flank of at least one of the two grooves, preferably both grooves, at least one region of the depression not being visible from the side.

22 Claims, 7 Drawing Sheets

(58) Field of Classification Search
CPC ... E05B 19/0058; E05B 27/0042; E05B 27/10
See application file for complete search history.

(56) References Cited

U.S. PATENT DOCUMENTS

| | | | | | |
|---|---|---|---|---|---|
| 5,715,717 | A * | 2/1998 | Widen | E05B 19/0017 70/420 |
| 5,819,566 | A * | 10/1998 | Eden, Jr. | E05B 27/0078 70/358 |
| 7,665,336 | B2 * | 2/2010 | Widen | E05B 27/0039 70/494 |
| 7,665,337 | B1 * | 2/2010 | Widen | E05B 19/0029 70/495 |
| 8,931,316 | B2 * | 1/2015 | Reine | E05B 27/0078 409/83 |
| 11,512,495 | B2 * | 11/2022 | Matschke | E05B 19/0058 |
| 2006/0075795 | A1 * | 4/2006 | Lurie | E05B 19/0017 70/375 |
| 2011/0056258 | A1 | 3/2011 | Widen | |
| 2022/0074230 | A1 * | 3/2022 | Tobias | E05B 19/0041 |

FOREIGN PATENT DOCUMENTS

| | | | | |
|---|---|---|---|---|
| EP | 4261366 | A1 * | 10/2023 | E05B 19/0017 |
| EP | 4379172 | A1 * | 6/2024 | E05B 19/0035 |
| WO | 0196696 | A1 | 12/2001 | |
| WO | 2012088562 | A2 | 7/2012 | |
| WO | WO-2012088562 | A1 * | 7/2012 | E05B 27/0042 |

OTHER PUBLICATIONS

Written Opinion for Application No. PCT/EP2022/081619, dated Feb. 3, 2023, 3 pages.

* cited by examiner

FLAT KEY FOR A LOCKING CYLINDER

CROSS-REFERENCE TO RELATED APPLICATIONS

This application is a 35 U.S.C. § 371 National Stage patent application of PCT/EP2022/081619, filed on 11 Nov. 2022, which claims the benefit of Austrian patent application no. GM50232/2021, filed on 15 Nov. 2021, the disclosures of which are incorporated herein by reference in their entirety.

TECHNICAL FIELD

The present disclosure relates to a flat key for a locking cylinder, in particular of locking systems, with substantially flat and approximately parallel flat sides, a key rear section and a key front section opposite thereto, toothed on the end face, for positioning tumbler pins divided into core pins and housing pins, which are spring-loaded in corresponding key channels of cylinder cores against the key front section in the direction of the key rear section, with grooves in the form of profiled variation elements and profiled guiding elements being provided in the flat sides of the flat key, with at least two grooves of one flat side of the flat key overlapping and being undercut in opposite directions. It further relates to a blank suitable for producing such a flat key, a method for producing such a blank and a locking cylinder for such a flat key.

BACKGROUND

There should be a clear assignment between key and lock. For simple locks that are not part of a locking system, each key should only lock "its" assigned lock. With locking systems, however, the assignment is not clear, as there are hierarchies: for example, the entrance gate should usually be able to be locked with all keys, but a room can often only be locked with a single key. On the other hand, the cleaning staff should have a key that locks all locks so that they can clean all rooms. This assignment of keys and locks or the exclusion of certain keys from certain locks is achieved, among other things, by the cross-sectional profile of the keys and the cross-section of the key channels. The key will only fit into the lock if the contour of a key channel cross-section corresponds to or encloses a flat key cross-section. As soon as the contour of the flat key cross-section intersects that of the key channel cross-section, the key has no locking authorization with regard to the aforementioned locking cylinder.

Basically, such flat keys have a guide profile and a variation profile. The guide profile is always the same for a series of keys and is manufactured with very small tolerances so that the key is guided precisely in the key channel. The variation profile differs from key to key and is intended to prevent an unauthorized key from being introduced into a key channel. The tolerances can be larger here.

This assignment between key and locking cylinder via the profile applies to the individual cylinder and the individual key, which is not directly part of a locking system, as well as to locking systems.

A blank for a flat key only has the grooves of the guide profile; the variation profile and the serration of the key front section are subsequently milled into such a blank. As mentioned, the guide profile should only have very small tolerances, which is why it should not be milled on the copy milling machine, but rather a correspondingly precise, prefabricated blank should be used. The less precise copy milling machine should only be used for milling the serration of the key front section and the variation profile.

The need for security is met if a key cannot be easily copied. The authorized person can obtain a replacement key from the original manufacturer using security certificates and strict identity checks. If key blanks are commercially available, a locksmith with a copy milling device can easily produce a replacement key by creating a serration on the key front section. If a copy milling device is also able to scan a cross-sectional profile on the flat sides of an original key and appropriate milling tools are available, a replacement key can also be machined out of a metal plate. So if the production of replacement keys for blocked key profiles was previously not possible due to the lack of a corresponding blank due to the restriction of free access on the market, the technical possibilities for locksmiths have been available for a long time to produce copies of a key both in terms of the serration and in terms of the profile. The scanning of a key profile is done mechanically or optically from the side. The result of this lateral scanning is followed by the grooving or feeding of one or a plurality of milling cutters to produce U-shaped, V-shaped or rectangular grooves. By tilting the key blank, grooves can also be produced at an angle to the longitudinal center plane of the profile cross-section, for example as undercut grooves. As mentioned, such keys are inferior due to their lower precision, but they usually still lock.

A flat key of the type mentioned above is known from WO 2012/088562 A2. According to this document, two overlapping, oppositely undercut grooves were provided, with the center of the groove base, viewed in the direction normal to the longitudinal center plane of the key, being concealed by these undercuts in at least one groove. The idea behind it was this: If the groove base is at least partially concealed, it is particularly difficult to determine the exact data of the groove (depth, width, angle, position). The edge resulting from the intersection of the two grooves can be scanned in the locking cylinder. However, this edge cannot be created directly by the locksmith, but is created by the intersection of the two grooves. If the data of at least one groove cannot be accurately captured, this edge is not located in the intended position and the key will not lock.

There are now laser scanners, and using these it is easy to capture the exact contour even of undercut grooves such that such keys are now relatively easy to copy.

Complicated grooves can now be devised, as shown, for example, in FIG. 15 of US 2011/0056258 A1. The problem, however, is that such keys cannot be produced by milling; such profiles must be broached, and broaching is considerably more complex and therefore more expensive than milling. In addition, keys with such a profile must be considerably thicker than is currently common in Central Europe, i.e. considerably thicker than the maximum of 2.8 mm that is common in Central Europe.

SUMMARY

The present disclosure improves a flat key of the type mentioned at the outset such that the cross-sectional profile cannot be completely captured even when using a laser scanner, with the key still being able to be produced by milling, i.e. relatively inexpensively, and it also being possible to implement the profile in a key of the conventional thickness of 2.8 mm.

This is achieved by providing a flat key of the type mentioned at the outset or by a blank for such a flat key according to the disclosure in that a depression is provided in the outer flank of at least one of the two grooves and that at least one region of the depression is not visible from the side. In order that a key copy cannot be inserted into the locking cylinder without such a depression, a locking cylinder according to the disclosure provides that an elevation is provided in the outer flank of at least one of the two ribs.

While at the priority date of WO 2012/088562 A2 it was still sufficient that the groove base of at least one groove was not visible when viewed in a direction normal to the longitudinal center plane, in order to make copying so complex that most locksmiths did not even attempt it, this is no longer sufficient due to the laser scanners that are readily available today. It is necessary that at least one point of the groove base is not visible at all from the side. Therefore, an additional depression is provided.

It is favorable if the two grooves including the depression(s) are already provided in the blank, i.e. are part of the guide profile, because then they have to be copied with high precision if it is desired to produce a problem-free locking key. As explained above, a guide profile has very small tolerances. If the key is now copied in such manner that the area around the grooves is simply milled away to make it larger, without paying attention to the exact contour, the key will no longer be guided precisely; it will "jam". Such inferior keys reflect poorly on the locking cylinder or the entire locking system, and according to the highest court rulings, this represents unfair competition. For reasons of competition law, the guide profile must be copied exactly so as not to devalue the entire locking system.

In accordance with WO 2012/088562 A2, it is expedient if, in addition to the two oppositely undercut grooves, a further groove is provided on the opposite flat side, which overlaps with at least one of the two oppositely undercut grooves, with the two undercut grooves and the further groove preferably being arranged in the central region of the two flat sides. On the one hand, the overlap makes it more difficult to insert lock picking tools, and on the other hand, it causes the key to lose its mechanical stability if the guide profile is milled larger than intended by the key manufacturer. Apart from the fact that such a key gets stuck, it also bends easily and thus becomes completely unusable. In the associated locking cylinder, it is therefore provided that in addition to the two oppositely undercut ribs, a further rib is provided on the opposite flat side, which overlaps with at least one of the two oppositely undercut ribs, with the two undercut ribs and the further rib preferably being arranged in the central region of the two flat sides, where the head ends of the core pins lie. When the ribs are arranged in the central region, they cover the core pins in the key channel on the head side, making scanning with lock picking tools more difficult.

Such a flat key is particularly difficult to copy if the two undercut angles of the undercut grooves are different sizes. In this way, a conclusion cannot be drawn from one undercut groove to the other.

It is particularly favorable if a depression is provided in the outer flank of both grooves, with the two depressions preferably being symmetrical, with the axis of symmetry lying in the open area of the two overlapping grooves, in particular in such manner that they can be produced with a T-slot milling cutter.

In this embodiment, it is further provided that the two depressions are symmetrical to one another and the axis of symmetry (corresponding to the shaft of the T-slot milling cutter) lies in the open area of the two overlapping grooves.

Accordingly, the associated locking cylinder is provided with an elevation on the outer flank of both ribs, with the two elevations preferably being symmetrical.

It is thereby expedient that the axis of symmetry of the two depressions is at an oblique angle to the longitudinal center plane of the flat key or the blank. In this way, a conclusion cannot be drawn from one depression to the other. Accordingly, it is provided for the associated locking cylinder that the axis of symmetry is at an oblique angle to the longitudinal center plane of the key channel.

Lastly, it is favorable if the depression or depressions are designed like grooves with a round base. This makes it even more difficult to recognize the exact contour. The corresponding locking cylinder then has the elevation or elevations rounded on the outside.

In order to produce a key blank for such flat keys, it is expedient to first produce the two undercut grooves and then mill a depression into at least one of the two undercut grooves using a T-slot milling cutter. In this way, no broaching tools are necessary to produce the depression.

It is thereby particularly expedient to mill a depression simultaneously in each of the undercut grooves using the T-slot milling cutter. This not only saves a work step, but also reduces the radial forces on the T-slot milling cutter.

Lastly, it is expedient if the T-slot milling cutter is guided at an acute or obtuse angle to the longitudinal center plane of the blank. This creates an additional "degree of freedom" that must be determined when copying the key. If the T-slot milling cutter were positioned exactly at right angles to the longitudinal center plane of the blank, determining the geometry of the grooves would be easier.

BRIEF DESCRIPTION OF THE DRAWINGS

The present disclosure is explained in more detail using the accompanying drawings, in which is shown.

DETAILED DESCRIPTION OF THE DRAWINGS

Figure 8:
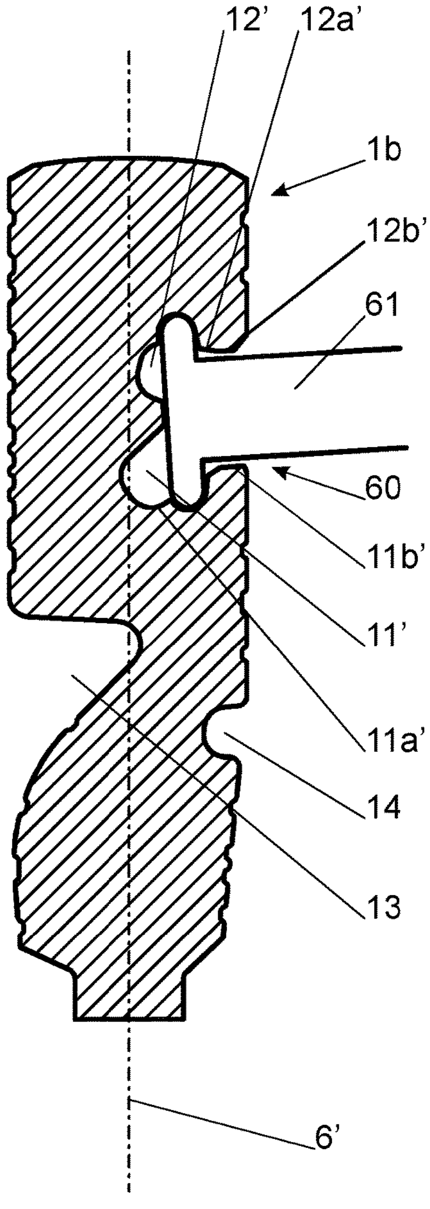
FIG. 8 the production of a blank according to the disclosure according to FIGS. 1*a*-1*d* and 2.

FIGS. 1*a* to 1*d* and 2 show a blank 1*b* with a key bow 1', with which it can be held. The blank 1*b* has, next to the key bow 1', the key bit, which has a key rear section 4 at the top, a key front section 5 at the bottom and two flat sides 2', 3' in between. Two grooves 11', 12' are provided in the right flat side 3' in FIG. 2. They overlap and are undercut in opposite directions, resulting in two outer flanks 11*a*', 12*a*', which face away from the respectively other groove 12', 11', and two inner flanks **11*b*', 12*b*', which face the respectively other groove 12', 11'. The outer flanks 11*a*', 12*a*' are angled; the reason for this will be explained with reference to FIG. 8**.

The intersection of the two grooves 11', 12' results in an edge B which can be scanned with a tumbler pin. Thus, a key copy which, instead of the two grooves 11', 12', has a large rectangular groove enclosing both grooves 11', 12' does not lock, although it can be inserted into the key channel. Point A can also be scanned with a tumbler pin. This is known from the above-mentioned WO 2012/088562 A2, and these options are retained in the flat key according to the disclosure.

Figure 1A:
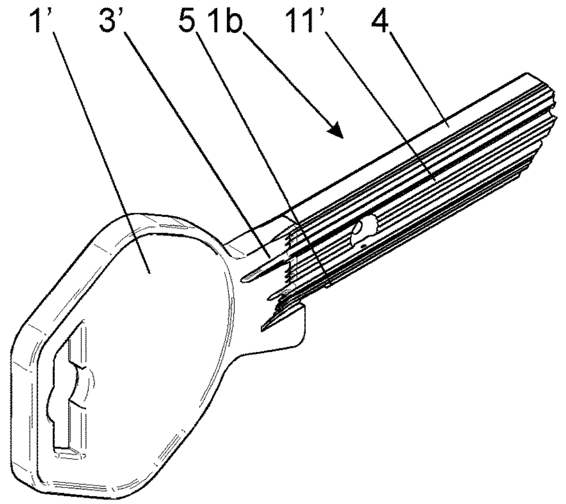
FIGS. 1*a* to 1*d* a blank in four different views.
Figure 1B:
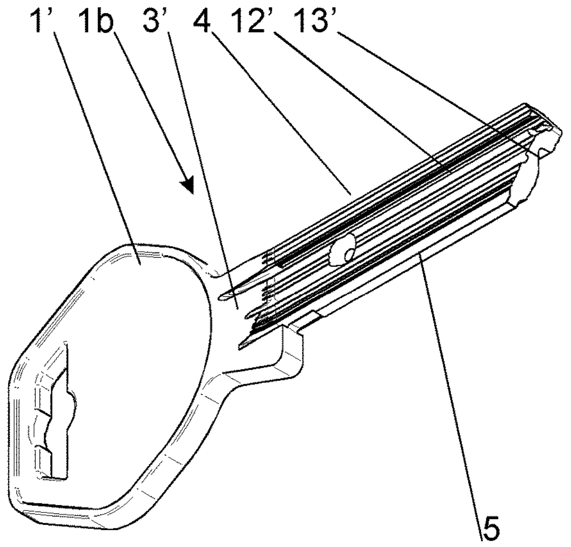
Figure 1C:
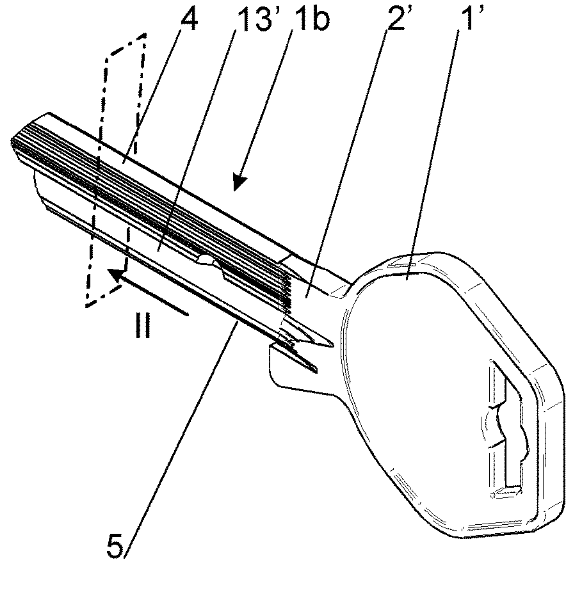
Figure 1D:
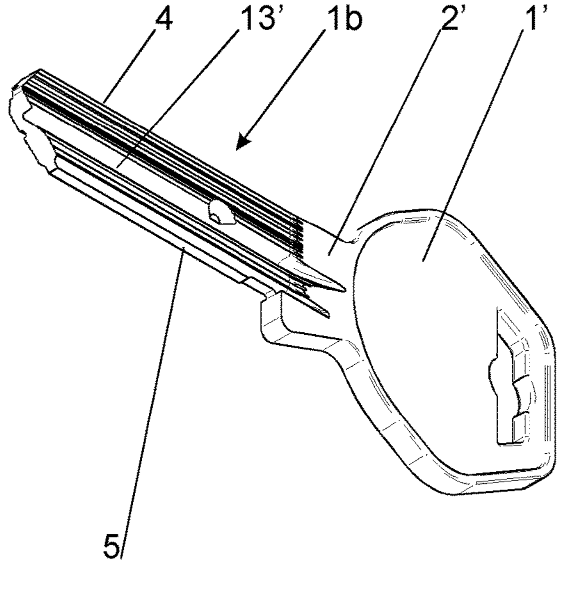
Figure 2:
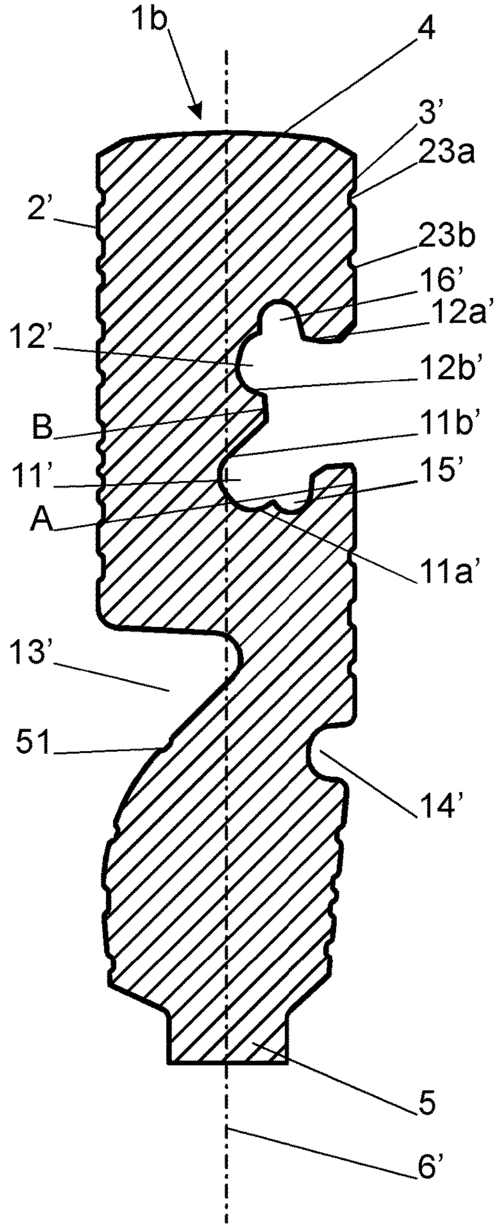
FIG. 2 a cross-section through this blank in the direction of the arrow II in FIG. 1*c;*

A further groove 13' is provided on the opposite flat side 2' on the left in FIG. 2, and a further groove 14' is provided on the flat side 3' below the two overlapping grooves 11' and 12'. The grooves 11', 12', 13' and 14' form the guide profile. They are present on all flat keys of this series, as they are already provided in the blank **1*b***. The grooves of the guide profile are used to precisely guide the flat key in the key channel of the locking cylinder, so they have particularly low tolerances.

According to the disclosure, two additional depressions 15' and 16' are now provided in this blank **1*b*, which is known in principle, namely in the outer flanks 11*a*' and 12*a*' of the grooves 11' and 12'. They can be milled with a T-slot milling cutter 60 (see FIG. 8). These additional depressions 15', 16' are located in the flanks 11*a*', 12*a*' and are therefore at a distance from the groove base (not known from the outset). It is particularly favorable if the T-slot milling cutter 60 is at an angle, i.e. the milling cutter axis 61 is not at a right angle to the longitudinal center plane 6'. In this way, the axis of symmetry 62 (see FIG. 2*a*) of the two depressions 15', 16' is at an oblique angle to the longitudinal center plane 6' of the blank 1*b*. If the two undercut angles α, β of the two grooves 11', 12' are different, conclusions cannot be drawn from one groove 11' to the other groove 12'**. Overall, measuring such a flat key is extremely complex.

Figure 2A:
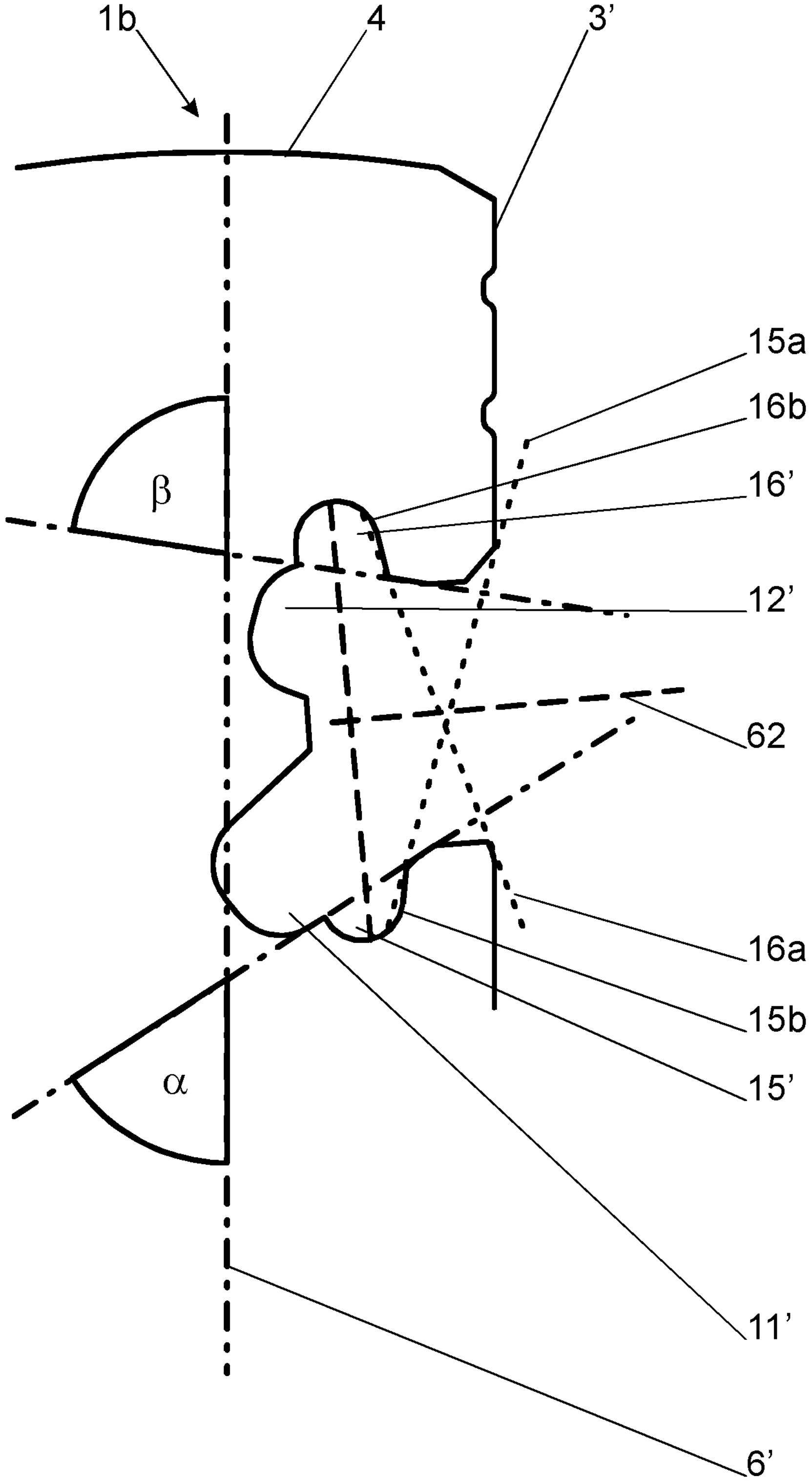
FIG. 2*a* an enlarged detail from FIG. 2.

The theoretical lines of sight **15*a* and 16*a* are also shown in FIG. 2*a*. In practice, a laser scanner has a certain extension, so it cannot be brought as close as desired to the flat side 3'. But even if it could be brought as close as desired according to the theoretical lines of sight 15*a* and 16*a*, there would still be regions 15*b*, 16*b*** that are not visible and therefore cannot be captured.

A T-slot milling cutter with a relatively thin shaft (e.g. 1 mm) has a shorter tool life than a milling cutter 60 (see FIG. 8) with a thicker shaft 61 of e.g. 1.3 mm. For this reason, the flanks **11*a*', 12*a*' are angled; they have bends 11*b*', 12*b*'. These bends 11*b*', 12*b*' widen the opening resulting from the two grooves 11', 12', so that more space is available for the shaft 61 of the milling cutter 60. These bends 11*b*', 12*b*'** can also be produced by milling.

Figure 3:
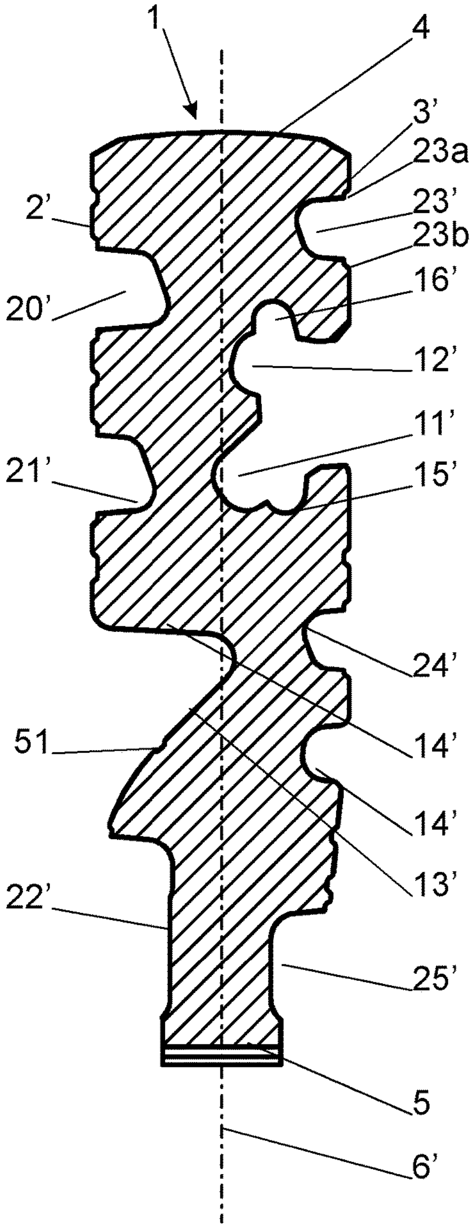
FIG. 3 an analogous cross-section through a flat key produced from this blank, that is in the direction of the arrow III in FIG. 4*c;*

A flat key 1 produced from such a blank (see FIG. 3) differs in cross-section from the blank **1*b* (see FIG. 2) by additional profiled variation grooves 20', 21', 22', 23', 24' and 25'. These can be different for each flat key 1, so that not every flat key 1 can be inserted into every locking cylinder, depending on the contour of the cross-section of the flat key and the key channel in the locking cylinder. Since the variation profile only serves to prevent flat keys 1 from being inserted into locking cylinders for which they are not authorized to lock, they can be manufactured with less precision. Thus only the blanks 1*b*** have to be manufactured precisely.

Figure 4A:
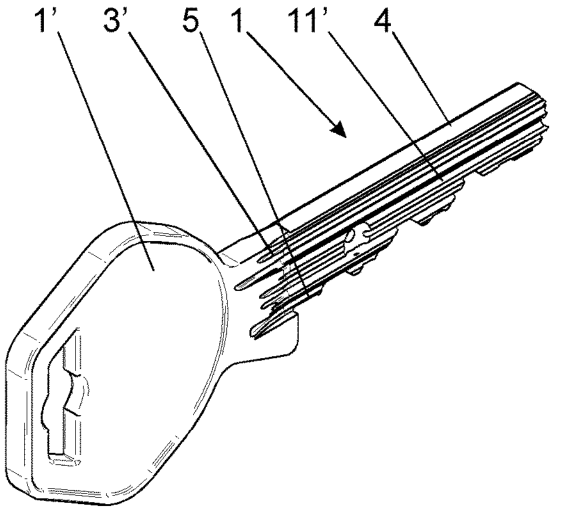
FIGS. 4*a* to 4*d* the flat key represented in section in FIG. 3 the finished flat key according to the disclosure in four different views.
Figure 4B:
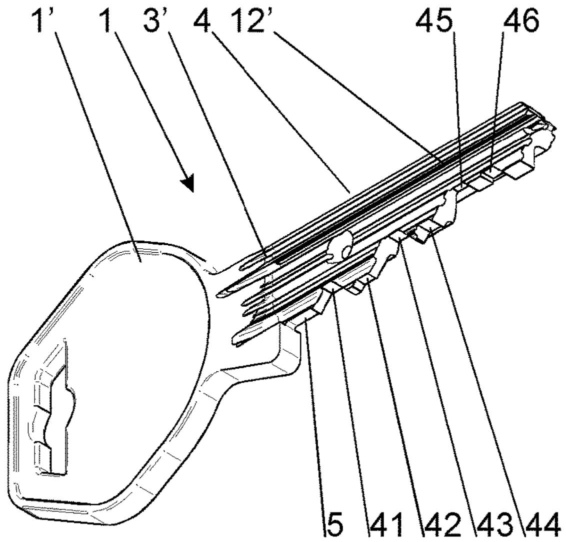
Figure 4C:
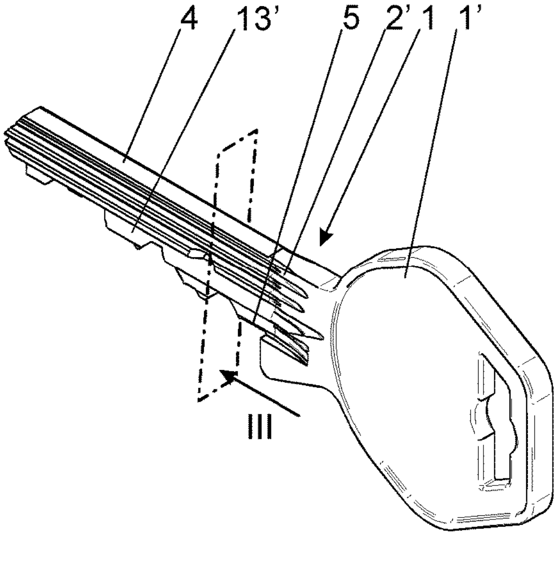
Figure 4D:
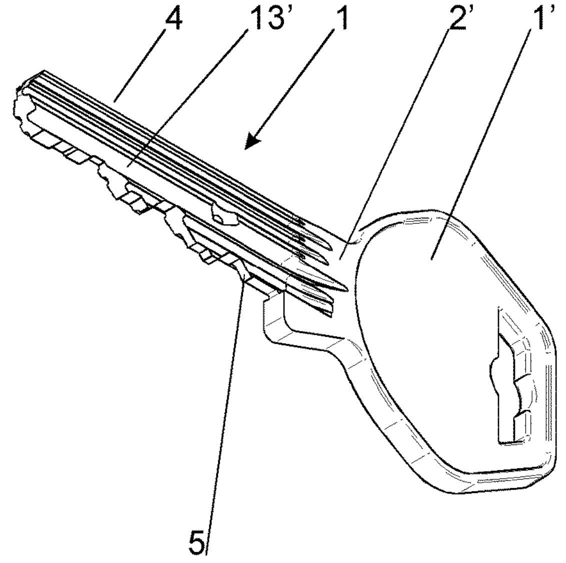

Furthermore, the flat keys 1 (see FIGS. **4*a* to 4*d*) differ from the blank 1*b* (see FIGS. 1*a* to 1*d*) in that they have serration cutouts 41, 42, 43, 44, 45 and 46 on the key front section 5 (see FIG. 4*b*). The number is not specified; for example, five or seven serration cutouts can be provided. These serration cutouts 41 to 46 are generally different for two different flat keys 1**.

Figure 5:
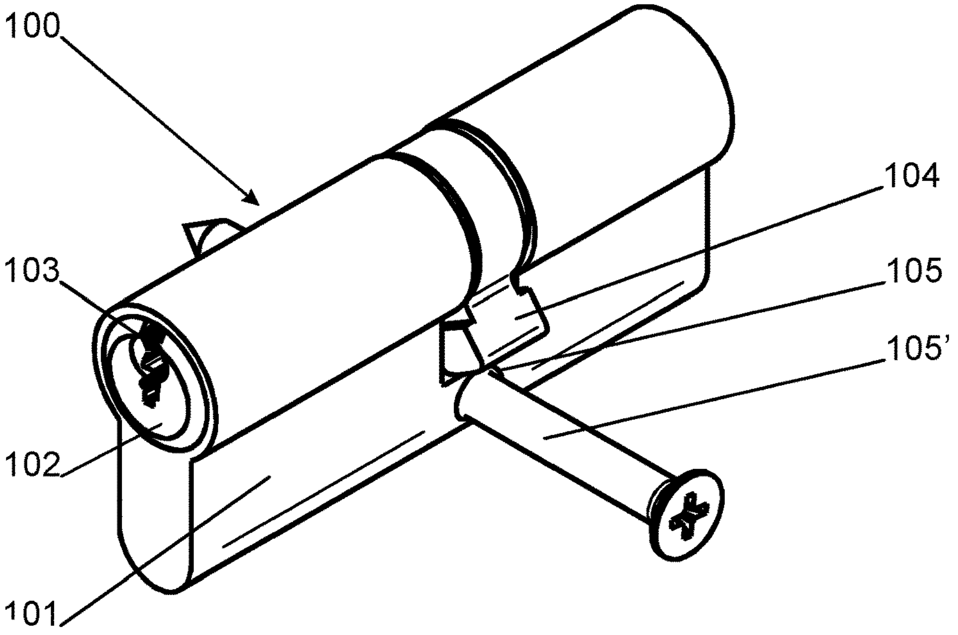
FIG. 5 a locking cylinder associated with this flat key in perspective view.

An associated locking cylinder 100 can be seen in perspective view in FIG. 5. It has a housing 101 in which a cylinder core 102 is inserted. This cylinder core 102 has a key channel 103. If a corresponding flat key is inserted into the key channel 103, the cylinder core 102 is coupled to a locking lug 104 (as will be explained below with reference to FIG. 7). If the flat key is now turned, the cylinder core 102 is twisted together with the locking lug 104 so that the locking lug 104 can actuate a corresponding element (e.g. a locking bolt or a push rod) of a lock. To fix the locking cylinder 100 in the lock, a threaded bore 105 is provided into which a long screw 105' can be screwed from the outside of the lock.

In FIG. 5, only one cylinder core 102 is visible. However, opposite the locking lug 104 (i.e. in the rear area of the locking cylinder 100, as seen in FIG. 1) there is another cylinder core such that the locking cylinder 100 can be locked from both sides of a door. It is a so-called double locking cylinder. However, the present disclosure can also be implemented with a single locking cylinder.

Figure 6:
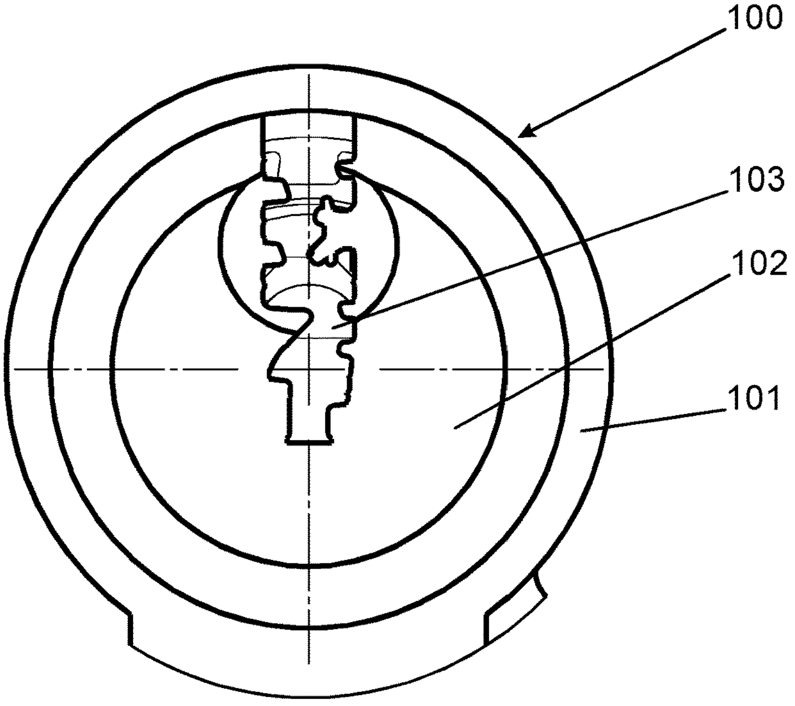
FIG. 6 the same from the front, namely a detail around the cylinder core.
Figure 7:
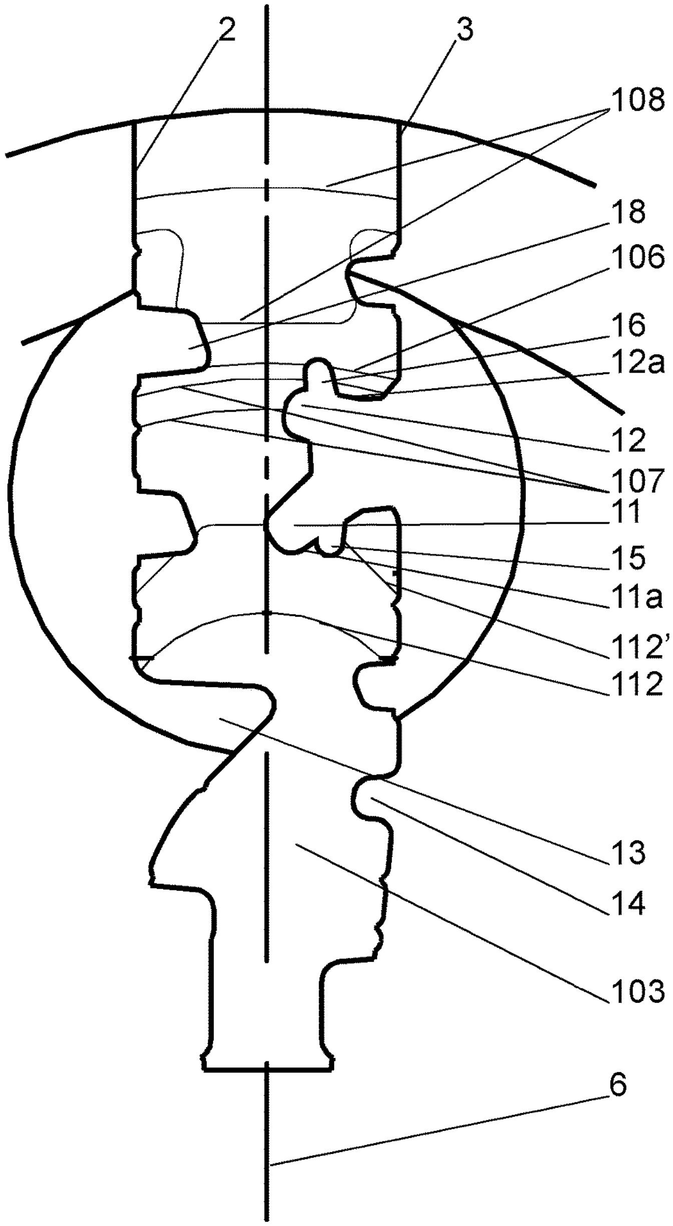
FIG. 7 a three-fold enlargement of a detail from FIG. 6.

In FIGS. 6 and 7, the key channel 103 can be seen in particular, which has a shape complementary to the cross-section of the flat key 1 (see FIG. 3), as will be explained in more detail with reference to FIG. 7.

In particular, for all grooves of the guide profile of the flat key, corresponding ribs 11, 12, 13 and 14 (see FIG. 7) are provided in the flat sides 2 and 3 of the key channel 103. The rib 13 overlaps at least with the rib 11, which makes it difficult to scan the tumbler pins in the locking cylinder 100, since it is not possible to penetrate into the key channel 103 with a flat plate. There are also corresponding ribs for the grooves of the variation profile, although they are not provided with reference numerals to improve clarity. It is important that the ribs 11 and 12 are provided with elevations 15 and 16 which correspond to the depressions 15' and 16' of the flat key 1 (see FIG. 3). As a result, a flat key in which these depressions 15', 16' are missing cannot be inserted into the key channel 103; it collides with the elevations 15, 16.

An advantage of these new keys 1 is that they can also be inserted into locking cylinders where the elevations 15, 16 are missing. That is to say that in the case of an existing locking system according to the prior art, it is sufficient to provide all existing flat keys with the additional depressions 15', 16' and, for example, to only equip the entrance doors with new locking cylinders, which have the elevations 15, 16 at the points corresponding to the depressions 15', 16' to prevent the new keys from being copied. The old flat keys or poor copies of the new flat keys cannot then be inserted into the key channel 103 of the new locking cylinders 100 of the entrance doors and are therefore worthless.

So-called tumbler pins are provided so that not just any flat key that fits into the key channel 103 (see FIGS. 5 and 6) locks the locking cylinder 100, as will be explained with reference to FIGS. 9 and 10.

FIG. 9 again shows the housing 101, the cylinder core 102 with key channel 103, the locking lug 104 and the threaded bore 105. It is also possible to see a coupling piece 106, which was inserted from a flat key 1 (see FIG. 10) into the locking lug 104 by means of a short push rod 107, so that the locking lug 104 is coupled to the cylinder core 102. If a flat key is inserted into the other cylinder core (not represented), the opposite coupling piece is pushed into the locking lug 104 and thus this other cylinder core is coupled to the locking lug 104; the coupling piece 106 is thereby automatically pushed out of the locking lug 104 so that the cylinder core 102 is decoupled.

Figure 9:
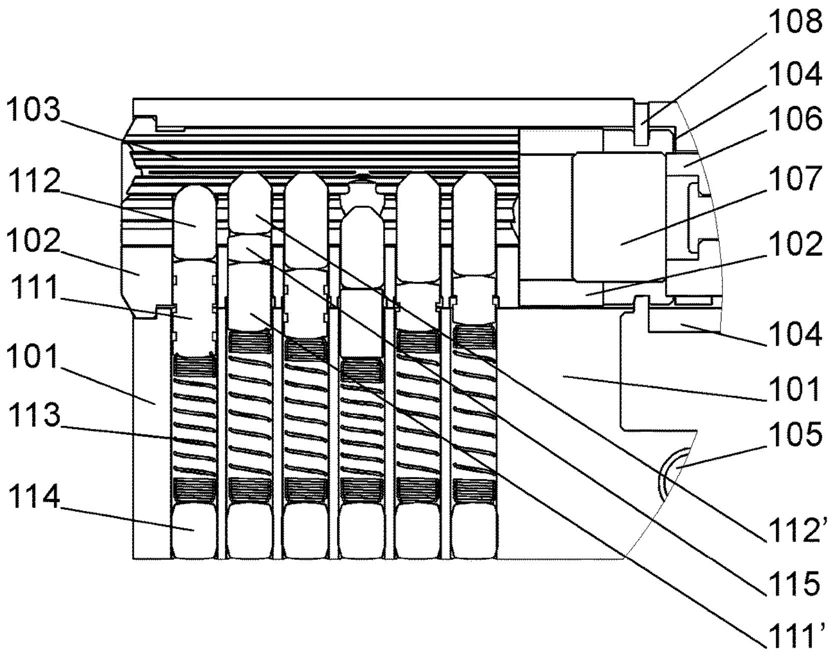
FIG. 9 a (partial) longitudinal section through a locking cylinder according to FIGS. 5 to 7 without flat key.
Figure 10:
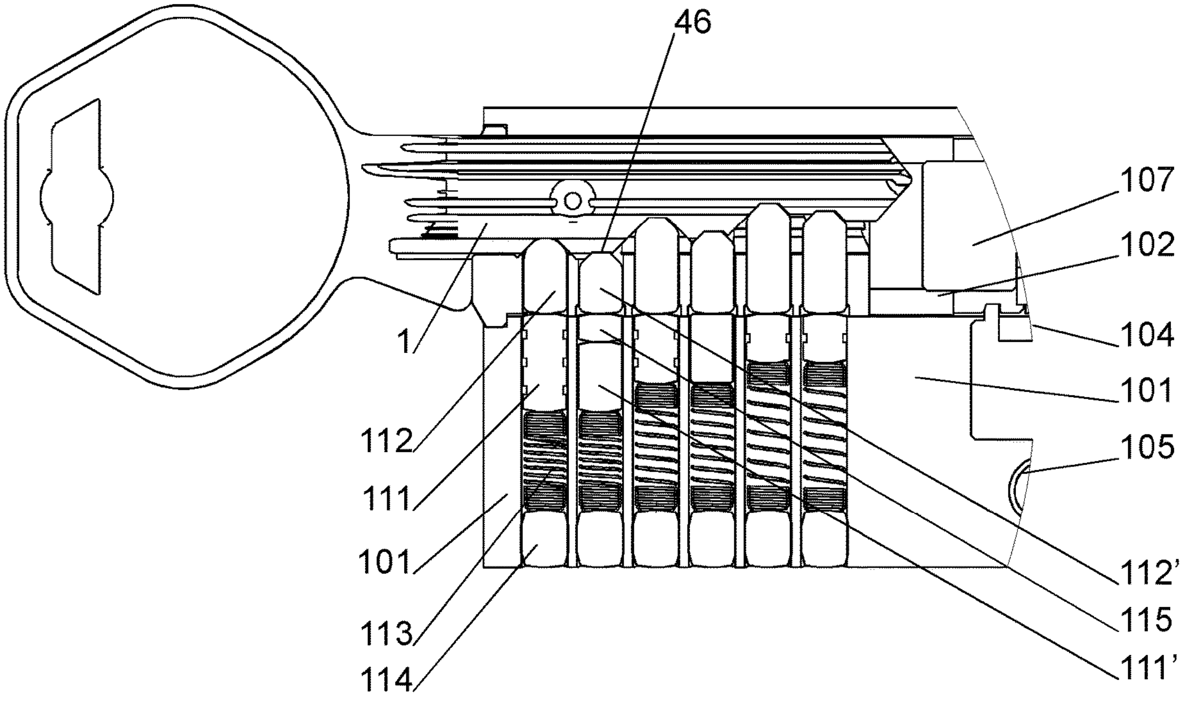
FIG. 10 a (partial) longitudinal section through this locking cylinder with flat key inserted into the key channel.

As can be further seen from FIG. 9, six bores are provided in the housing 101, which continue from the housing 101 into the cylinder core 102 up to the key channel 103. Tumbler pins, which are composed of housing pin 111 and core pin 112, are inserted into these bores. The bores are closed at the bottom by plugs 114, and the tumbler pins are biased upwards by springs 113, which are supported on the plugs 114. The reference numerals 111 to 114 are only entered for the frontmost bore. Housing pins, core pins, springs and plugs are also provided in the other five bores. In the second bore from the front (from the left, as seen in FIG. 4), the housing pin is marked 111' and the core pin is marked 112'. A special feature can be seen here: the tumbler pin is divided into three parts, between the housing pin 111' and the core pin 112' there is an intermediate piece 115, the significance of which will be explained with reference to FIG. 10.

As can be seen from FIG. 9, the housing pins 111 protrude into the cylinder core 102 if no flat key is inserted. They thus prevent the cylinder core 102 from being twisted.

If a suitable flat key 1 is now inserted (see FIG. 10), its serration presses the core pins 112 downwards to such an extent that the pitch plane between core pin 112 and housing pin 111 lies at the boundary between cylinder core 102 and housing 101 for all tumbler pins. The cylinder core 102 can thus be rotated, taking the locking lug 104 with it. The key locks. To prevent the cylinder core 102 from being pulled out of the housing 101 in this situation, a snap ring 108 (see FIG. 4) is provided, which engages in a slot of the housing 101 and in a groove of the cylinder core 102 and thus axially secures the cylinder core 102.

If even one serration cutout were too deep or not deep enough, the housing pin 111 or the core pin 112 would prevent rotation.

An exception is the second tumbler pin with the intermediate piece 115. As a result of the intermediate piece 115, flat keys with two different serrations lock in the case of the locking cylinder 100 represented here: if the second serration cutout is deeper by the height of the intermediate piece 115 than in the example represented, instead of the pitch plane between the core pin 112' and the intermediate piece 115, the pitch plane between the intermediate piece 115 and housing pin 111' comes to lie on the boundary between cylinder core 102 and housing 101, and this flat key also locks. This is used in locking systems where, for example, a locking cylinder is to be locked by a key that only matches this locking cylinder and by a master key. In more complicated locking systems, such intermediate pieces 115 can of course be provided for a plurality of tumbler pins or even for all tumbler pins.

In FIGS. 6 and 7, it is possible to see some parts of the locking cylinder in the background in the key channel 103, represented with thin lines. In FIG. 7 these parts are provided with reference numerals. Specifically, it is possible to see the core pin 112, the core pin 112', the push rod 107 and the snap ring 108.

The invention claimed is:

1. A flat key for a locking cylinder, in particular for locking systems, comprising substantially flat and approximately parallel flat key sides, a key rear section at a top, and a key front section at a bottom opposite the key rear section, toothed on an end face of the key front section, for positioning tumbler pins divided into core pins and housing pins, which are spring-loaded in corresponding key channels of cylinder cores against the key front section in a direction of the key rear section, wherein grooves formed as profiled variation elements and profiled guiding elements are provided in the flat sides of the flat key, wherein first and second grooves of one flat side of the flat key overlap and are undercut in opposite directions with respect to the flat side of the flat key, wherein third and fourth grooves are provided in the outer flanks of the first and second grooves, respectively, and in that at least one region of said third and fourth grooves forms a further undercut that is not visible from the side, wherein along a direction from the key rear section to the key front section, the third and fourth grooves extend further into the flat side of the flat key than the first and second grooves.

2. The flat key according to claim 1, wherein in addition to the two oppositely undercut grooves, an inlet is provided on the opposite flat side, which overlaps with at least one of the two oppositely undercut grooves.

3. The flat key according to claim 2, wherein the two undercut grooves and the inlet are arranged in the central region of the two flat sides.

4. The flat key according to claim 1, wherein two undercut angles ($\alpha$, $\beta$) of the undercut grooves are different sizes.

5. The flat key according to claim 1, wherein the third and fourth groove are symmetrical, wherein an axis of symmetry lies in the open area of the two overlapping grooves, whereby they are configured to be produced with a T-slot milling cutter.

6. The flat key according to claim 5, wherein the axis of symmetry of the third and fourth grooves is at an oblique angle to the longitudinal center plane of the flat key or the blank.

7. The flat key according to claim 1, wherein the third and fourth grooves each have a round base.

8. A locking cylinder having a housing and a cylinder core configured to be rotated in the housing, wherein a key channel with two flat sides for inserting a suitable flat key according to claim 1 is provided in the cylinder core; wherein bores are provided in the housing which, in the initial position of the cylinder core, continue in alignment in the cylinder core into the key channel, wherein tumbler pins subdivided into core pins and housing pins are provided in these bores, which are positioned by the serration cutouts of the matching flat key such that the pitch plane between the core pin and the housing pin of each tumbler pin lies at the edge of the cylinder core, so that the cylinder core is configured to be rotated with the matching flat key; wherein ribs are provided in the flat sides as profiled variation elements and as profiled guiding elements, wherein at least two ribs overlap on a flat side and are undercut in opposite directions, wherein an elevation is provided in the outer flank of at least one of the two ribs.

9. The locking cylinder according to claim 8 for the flat key wherein in addition to the two oppositely undercut grooves, a further groove is provided on the opposite flat side, which overlaps with at least one of the two oppositely undercut grooves, wherein in addition to the two oppositely undercut ribs, a further rib is provided on the opposite flat side, which overlaps with at least one of the two oppositely undercut ribs.

10. The locking cylinder according to claim 9 for the flat key wherein in addition to the two oppositely undercut grooves, a further groove is provided on the opposite flat side, which overlaps with at least one of the two oppositely undercut grooves wherein the two undercut grooves and the further groove are arranged in the central region of the two flat sides, wherein the two undercut ribs and the further rib are arranged in the central region of the two flat sides, where the head ends of the core pins lie.

11. The locking cylinder according to claim 8 for the flat key wherein the two undercut angles (α, β) of the undercut grooves are different sizes, wherein the two undercut angles (α, β) are different sizes.

12. The locking cylinder according to claim 8 for the flat key wherein a third groove and a fourth groove are provided in the outer flank of the first and second grooves, respectively, wherein an elevation is provided on the outer flanks of both ribs.

13. The locking cylinder according to claim 12 for the flat key wherein the third and fourth grooves are symmetrical, wherein an axis of symmetry lies in the open area of the two overlapping grooves, whereby they are configured to be produced with a T-slot milling cutter, wherein the two elevations are symmetrical.

14. The locking cylinder according to claim 13 for the flat key wherein the axis of symmetry of the third and fourth grooves is at an oblique angle to the longitudinal center plane of the flat key or the blank, wherein the axis of symmetry is at an oblique angle to the longitudinal center plane of the key channel.

15. The locking cylinder according to claim 8 for the flat key wherein the third and fourth grooves each have a round base, wherein the elevation(s) are rounded on the outside.

16. The flat key according to claim 1, wherein the third and fourth grooves are disposed closer to an outside surface of the flat side of the flat key than the first and second grooves are disposed, such that the third and fourth grooves extend beyond the outer flanks of the first and second grooves, respectively.

17. The flat key according to claim 1, wherein the first and second grooves disposed along a direction perpendicular to the flat side of the flat key extend further into the flat side of the flat key than the third and fourth grooves.

18. The flat key according to claim 1, wherein the first groove extends along a first axis, wherein the second groove extends along a second axis that is different from the first axis, wherein the third and fourth grooves are commonly oriented along a third axis that is different from the first and second axes.

19. A key blank for a flat key for a locking cylinder, in particular for locking systems, comprising substantially flat and approximately parallel flat key sides, a key rear section, and a key front section, wherein grooves formed as profiled guiding elements are provided in the flat sides of the key blank, wherein first and second grooves of one side of the key blank overlap and are undercut in opposite directions, wherein a third groove is provided in the outer flank of at least one of the two grooves, and in that at least one region of said third groove is not visible from the outside along all theoretical straight lines of sight.

20. A method for producing a key blank for a flat key comprising substantially flat and approximately parallel flat key sides, a key rear section, and a key front section, wherein grooves formed as profiled guiding elements are provided in the flat sides of the key blank, wherein at least two grooves of one side of the key blank overlap and are undercut in opposite directions, wherein a third groove is provided in the outer flank of at least one of the two grooves, and in that at least one region of said third groove is not visible from the outside along all theoretical straight lines of sight, the method including the following steps:

producing the at least two undercut grooves, and milling a third groove into at least one of the at least two undercut grooves using a T-slot milling cutter.

21. The method according to claim 20, wherein a fourth groove is milled simultaneously in each of the two undercut grooves using the T-slot milling cutter.

22. The method according to claim 20, wherein the T-slot milling cutter is guided at an acute or obtuse angle to the longitudinal center plane of the blank.

* * * * *